(12) United States Patent
Yamaguchi et al.

(10) Patent No.: US 11,926,057 B2
(45) Date of Patent: Mar. 12, 2024

(54) ROBOT SYSTEM

(71) Applicant: YAMAHA HATSUDOKI KABUSHIKI KAISHA, Iwata (JP)

(72) Inventors: Kota Yamaguchi, Shizuoka (JP); Toshihiro Michizoe, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 539 days.

(21) Appl. No.: 17/053,523

(22) PCT Filed: Jun. 14, 2018

(86) PCT No.: PCT/JP2018/022809
§ 371 (c)(1),
(2) Date: Nov. 6, 2020

(87) PCT Pub. No.: WO2019/239563
PCT Pub. Date: Dec. 19, 2019

(65) Prior Publication Data
US 2021/0233228 A1 Jul. 29, 2021

(51) Int. Cl.
*B25J 9/16* (2006.01)

(52) U.S. Cl.
CPC ........... *B25J 9/1669* (2013.01); *B25J 9/1697* (2013.01); *G05B 2219/39484* (2013.01)

(58) Field of Classification Search
CPC ...... B25J 9/1612; B25J 9/1656; B25J 9/1661; B25J 9/1664; B25J 9/1666; B25J 9/1669;
(Continued)

(56) References Cited

U.S. PATENT DOCUMENTS 9,333,649 B1 * 5/2016 Bradski .................. B25J 19/00
9,802,317 B1 10/2017 Watts et al.
(Continued)

FOREIGN PATENT DOCUMENTS

CN 102049778 A 5/2011
CN 105983965 A 10/2016
(Continued)

OTHER PUBLICATIONS

An Office Action mailed by China National Intellectual Property Administration dated Feb. 14, 2023, which corresponds to Chinese Patent Application No. 201880094149.7 and is related to U.S. Appl. No. 17/053,523; with English language summary.
(Continued)

*Primary Examiner* — Spencer D Patton
(74) *Attorney, Agent, or Firm* — Studebaker & Brackett PC

(57) ABSTRACT

A robot system includes a robot including a hand portion which grips and takes out a workpiece from an accommodation unit in which a plurality of workpieces are accommodated, and transports the workpiece to a predetermined position; a robot control unit which controls conveyance operation of the robot of taking out the workpiece from the accommodation unit and transporting the workpiece to the predetermined position; and a conveyance condition setting unit which sets a conveyance condition regarding the conveyance operation and including, in the workpiece, at least a grip prohibited region that is prohibited from being gripped by the hand portion. The robot control unit controls the robot based on the conveyance condition set by the conveyance condition setting unit.

18 Claims, 14 Drawing Sheets

(58) Field of Classification Search
CPC ...... B25J 9/1674; B25J 9/1676; B25J 9/1679; B25J 9/1697; G05B 2219/39473; G05B 2219/39474; G05B 2219/39484; G05B 2219/39505; G05B 2219/39536; G05B 2219/39539; G05B 2219/39542; G05B 2219/39543
See application file for complete search history.

(56) References Cited

U.S. PATENT DOCUMENTS

| | | | |
|---|---|---|---|
| 2011/0010009 A1 | 1/2011 | Saito | |
| 2011/0074171 A1 | 3/2011 | Maehara et al. | |
| 2011/0098859 A1 | 4/2011 | Irie et al. | |
| 2012/0059517 A1 | 3/2012 | Nomura | |
| 2013/0245822 A1* | 9/2013 | Kawanami | B25J 9/1612 700/245 |
| 2014/0031985 A1 | 1/2014 | Kumiya | |
| 2014/0147240 A1 | 5/2014 | Noda et al. | |
| 2015/0127162 A1 | 5/2015 | Gotou | |
| 2016/0082590 A1 | 3/2016 | Kawanami et al. | |
| 2016/0167227 A1 | 6/2016 | Wellman et al. | |
| 2016/0167228 A1 | 6/2016 | Wellman et al. | |
| 2016/0288318 A1 | 10/2016 | Nakazato | |
| 2017/0021499 A1 | 1/2017 | Wellman et al. | |
| 2017/0028562 A1* | 2/2017 | Yamazaki | B25J 9/163 |
| 2017/0080571 A1 | 3/2017 | Wagner et al. | |
| 2017/0106532 A1 | 4/2017 | Wellman et al. | |
| 2017/0136632 A1 | 5/2017 | Wagner et al. | |
| 2017/0173798 A1 | 6/2017 | Watanabe et al. | |
| 2018/0056523 A1 | 3/2018 | Aiso et al. | |
| 2018/0141211 A1 | 5/2018 | Wellman et al. | |
| 2019/0009409 A1 | 1/2019 | Kawanami et al. | |
| 2019/0351557 A1* | 11/2019 | Suzuki | B25J 9/1612 |
| 2020/0254622 A1 | 8/2020 | Yamazaki et al. | |

FOREIGN PATENT DOCUMENTS

| | | |
|---|---|---|
| CN | 107000208 A | 8/2017 |
| CN | 206501118 U | 9/2017 |
| DE | 11 2012 002 677 T9 | 7/2014 |
| DE | 10 2014 016 033 A1 | 5/2015 |
| EP | 2 263 837 B1 | 6/2013 |
| EP | 3 290 165 A2 | 3/2018 |
| JP | 2001-095348 A | 4/2001 |
| JP | 2002-200588 A | 7/2002 |
| JP | 2010-264559 A | 11/2010 |
| JP | 2011-073066 A | 4/2011 |
| JP | 2013-184273 A | 9/2013 |
| JP | 5642738 B2 | 12/2014 |
| JP | 2015-085488 A | 5/2015 |
| JP | 2016-020011 A | 2/2016 |
| JP | 2016-197393 A | 11/2016 |
| JP | 2017-030135 A | 2/2017 |

OTHER PUBLICATIONS

International Search Report issued in PCT/JP2018/022809; dated Sep. 4, 2018.

An Office Action issued by the German Patent and Trade Mark Office dated Feb. 22, 2022, which corresponds to German Patent Application No. 112018007727.6 and is related to U.S. Appl. No. 17/053,523; with English language translation.

* cited by examiner

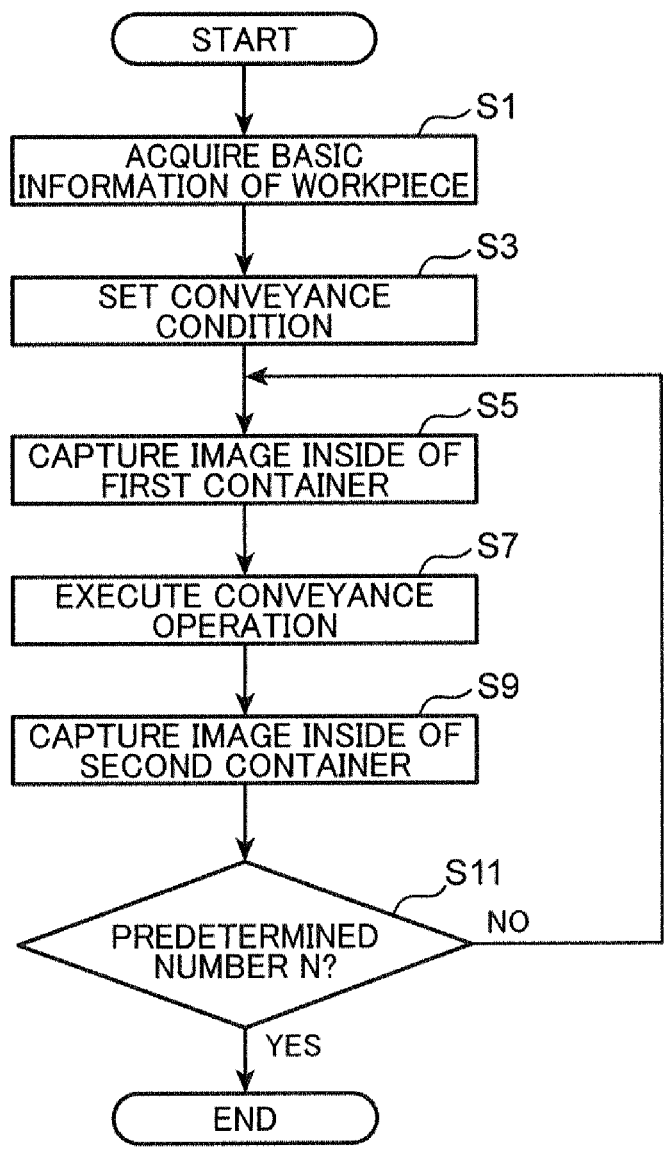

FIG.8

|  | | WORKPIECE QUALITY EVALUATION | | |
|---|---|---|---|---|
|  | | A | B | C |
| PICKING EVALUATION | A | $Ra_{11}$ | $Ra_{12}$ | $Ra_{13}$ |
|  | B | $Ra_{21}$ | $Ra_{22}$ | $Ra_{23}$ |
|  | C | $Ra_{31}$ | $Ra_{32}$ | $Ra_{33}$ |
| PLACEMENT EVALUATION | A | $Rb_{11}$ | $Rb_{12}$ | $Rb_{13}$ |
|  | B | $Rb_{21}$ | $Rb_{22}$ | $Rb_{23}$ |
|  | C | $Rb_{31}$ | $Rb_{32}$ | $Rb_{33}$ |

FIG.9A

| $Ra_{11}$ | GRIPPING FORCE | GRIP POSITION |
|---|---|---|
| COMPENSATION | 100 | 100 |

FIG.9B

| $Ra_{13}$ | GRIPPING FORCE | GRIP POSITION |
|---|---|---|
| COMPENSATION | 0 | 60 |

FIG.10A

| $Rb_{11}$ | GRIPPING FORCE | TRANSPORT SPEED | GRIP POSITION |
|---|---|---|---|
| COMPENSATION | 100 | 100 | 100 |

FIG.10B

| $Rb_{13}$ | GRIPPING FORCE | TRANSPORT SPEED | GRIP POSITION |
|---|---|---|---|
| COMPENSATION | 0 | 0 | 60 |

US 11,926,057 B2

ROBOT SYSTEM

CROSS-REFERENCE TO RELATED APPLICATION

This application is a National Stage of International Patent Application No. PCT/JP2018/022809, filed Jun. 14, 2018, the entire content of which is incorporated herein by reference.

BACKGROUND

Technical Field

The present disclosure relates to a robot system including a robot which takes out the workpiece from a container or the like in which a plurality of workpieces are accommodated, and transports.

Background Art

As a system for taking out a workpieces from a container in which a plurality of workpieces are accommodated being loaded in bulk, there is known a robot system in which a robot including a hand portion takes out a workpiece as disclosed, for example, in JP5642738 B2. This robot system specifies a workpiece at the highest position based on surface positions of workpieces loaded in bulk which are measured by a three-dimensional measuring device, sets a target position and a target posture of a hand portion capable of taking out the workpieces, and controls the hand portion based on the target position and the target posture.

In such a conventional robot system as disclosed in JP5642738 B2, even when take-out of a workpiece from a container succeeds, a grip portion of a hand portion might be damaged or deformed while the workpiece is transported. It cannot be therefore said that appropriate take-out or transport of a workpiece is conducted also in terms of quality of a workpiece, and there is room for improvement in this respect.

SUMMARY

The present disclosure has been made in view of the above-described circumstances, and accordingly, the present disclosure provides a robot system capable of taking out a workpiece from a container in which a plurality of workpieces are accommodated and transporting the workpiece to a predetermined position while maintaining excellent quality.

A robot system according to one aspect of the present disclosure includes a robot including a hand portion which grips and takes out a workpiece from an accommodation unit in which a plurality of workpieces are accommodated, and transports the workpiece to a predetermined position; a robot control unit which controls conveyance operation of the robot of taking out the workpiece from the accommodation unit and transporting the workpiece to the predetermined position; and a conveyance condition setting unit which sets a conveyance condition regarding the conveyance operation. Also, the conveyance condition includes, in the workpiece, at least a grip prohibited region that is prohibited from being gripped by the hand portion, in which the robot control unit controls the robot based on the conveyance condition set by the conveyance condition setting unit.

BRIEF DESCRIPTION OF THE DRAWINGS

FIG. 3 is a flow chart for describing basic operation of the robot system;

FIG. 8 is a table showing one example of a compensation table;

FIG. 9A is a table showing one example of a specific compensation in the compensation table in FIG. 8;

FIG. 9B is a table showing one example of a specific compensation in the compensation table in FIG. 8;

FIG. 10A is a table showing one example of a specific compensation in the compensation table in FIG. 8;

FIG. 10B is a table showing one example of a specific compensation in the compensation table in FIG. 8;

DETAILED DESCRIPTION

In the following, a robot system according to an embodiment of the present disclosure will be described based on the drawings.

[Overall Configuration of Robot System]

Figure 1:
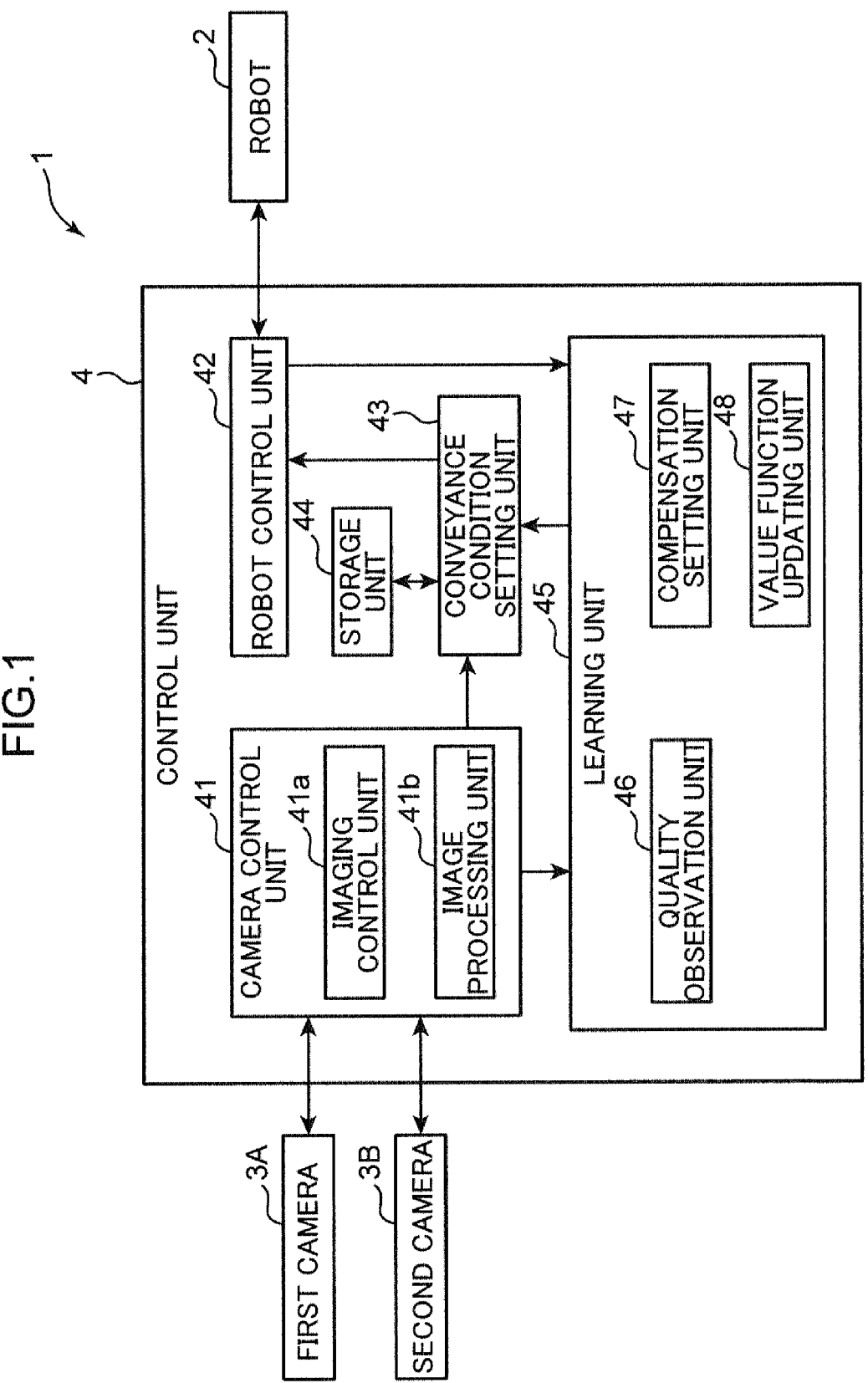
FIG. 1 is a block diagram showing a configuration of a robot system according to one embodiment of the present disclosure.

FIG. 1 is a block diagram showing a configuration of a robot system 1 according to one embodiment of the present disclosure. The robot system 1 includes a robot 2, a first camera 3A (first and third imaging units), a second camera 3B (a second imaging unit), and a control unit 4 which controls the robot 2 and the respective cameras 3A and 3B. The robot system 1 is a system for taking out a workpiece from a container in which a plurality of workpieces are accommodated being loaded in bulk and conveying the workpiece to a desired target position (predetermined position).

Figure 2:
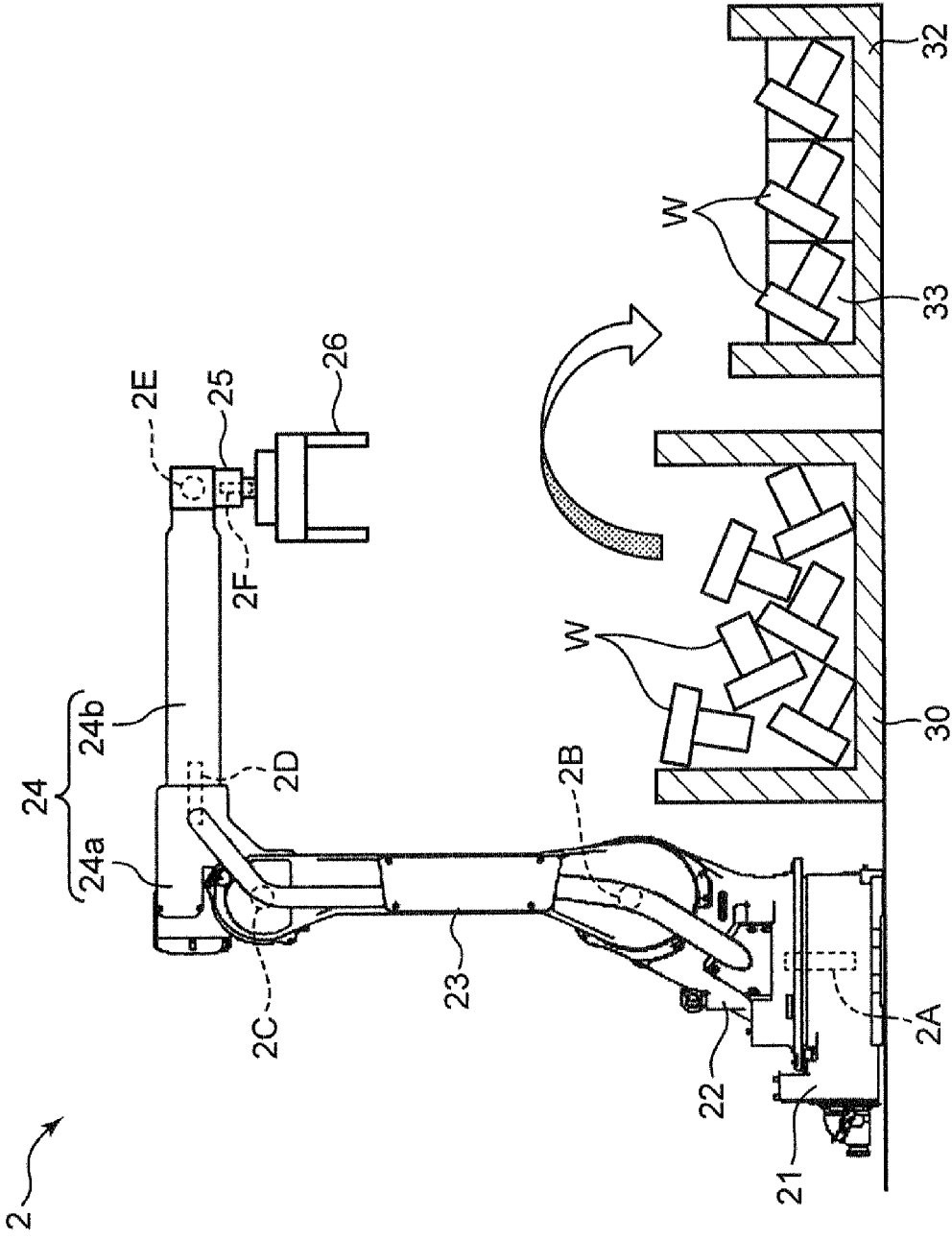
FIG. 2 is a side view showing one example of a robot provided in the robot system.

FIG. 2 is a side view showing one example of the robot 2 included in the robot system 1. The robot 2 is a robot which takes out (picking) a workpiece W from a first container 30 (an accommodation unit) in which a plurality of workpieces W are accommodated being loaded in bulk, and transports the workpiece W to another second container 32. Each of the containers 30 and 32 is a bottomed container rectangular in a plan view with an upper side opened. The second container 32 is a plate-shaped container which is internally sectioned into a plurality of accommodation areas 33. The robot 2 takes out the workpiece W via an opening of the first container 30 and places the workpiece W in any of the accommodation areas 33 via an opening of the second container 32. Assumed examples of a situation where the workpiece W is taken out from the first container 30 and transported to each of the accommodation areas 33 of the second container 32 in this manner includes a situation where, at a work site of machine manufacturing, parts are taken out from a container in which a plurality of parts are loaded in bulk, and set to a kitting tray.

The robot 2 is a six-axis vertical articulated robot including a base portion 21, a trunk portion 22, a first arm 23, a second arm 24, a wrist portion 25, and a hand portion 26. The base portion 21 is fixedly installed on a floor, a pedestal, or the like. The trunk portion 22 is arranged on an upper surface of the base portion 21 so as to be rotatable in both forward and backward directions around a first shaft 2A extending in a vertical direction (up-down direction). The first arm 23 is an arm member having a predetermined length and having one end portion in its longitudinal direction attached to the trunk portion 22 via a horizontally extending second shaft 2B. The first arm 23 is rotatable around the second shaft 2B in both the forward and backward directions.

The second arm 24 includes an arm base 24a and an arm portion 24b. The arm base 24a is a base portion of the second arm 24 and attached to the other end of the first arm 23 in the longitudinal direction via a third shaft 2C extending horizontally and in parallel to the second shaft 2B. The arm base 24a is rotatable around the third shaft 2C in both the forward and backward directions. The arm portion 24b is an arm member having a predetermined length and has one end portion in its longitudinal direction attached to the arm base 24a via a fourth shaft 2D vertical to the third shaft 2C. The arm portion 24b is rotatable around the fourth shaft 2D in both the forward and backward directions.

The wrist portion 25 is attached to the other end portion of the arm portion 24b in the longitudinal direction via a fifth shaft 2E extending horizontally and in parallel to the second shaft 2B and the third shaft 2C. The wrist portion 25 is rotatable around the fifth shaft 2E in both the forward and backward directions.

The hand portion 26 is a part which takes out the workpiece W from the first container 30 in the robot 2, the part being attached to the wrist portion 25 via a sixth shaft 2F vertical to the fifth shaft 2E. The hand portion 26 is rotatable around the sixth shaft 2F in both the forward and backward directions. The structure of the hand portion 26 is not particularly limited and can be any structure which can hold the workpiece W in the first container 30, for example, a structure having a plurality of pawl portions which grips and holds the workpiece W or a structure having an electromagnet or a negative pressure generation device which generates a sucking force for the workpiece W. In the present embodiment, the hand portion 26, having a structure including a pair of pawl portions capable of contacting with and separating from each other, takes out the workpiece W in the first container 30 by gripping (pinching) the workpiece W by the pair of pawl portions.

The trunk portion 22, the first arm 23, the second arm 24 (the arm base 24a, the arm portion 24b), the wrist portion 25, and the hand portion 26 of the robot 2 are each driven to operate by a driving motor (not shown).

The number of shafts of the robot 2 is not limited to six but may be other number. Additionally, the robot 2 is not particularly limited as long as the robot includes a hand portion capable of taking out the workpiece W from the first container 30. It is possible to adopt, for example, a vertical articulated robot or a horizontal articulated robot, or a double arm type articulated robot.

The first camera 3A, which captures images including the workpieces W accommodated in the first container 30, is arranged above the first container 30. The first camera 3A also captures images including the hand portion 26 after workpiece W take-out operation in order to check whether or not the workpiece W has been taken out from the first container 30. The second camera 3B, which captures images including the workpieces W accommodated in the second container 32, is arranged above the second container 32. These first and second cameras 3A and 3B form a three-dimensional measuring instrument together with a camera control unit 41 to be described later.

The control unit 4 collectively controls the robot 2 and the respective cameras 3A and 3B as described above. The control unit 4 includes the camera control unit 41, a robot control unit 42, a conveyance condition setting unit 43, a storage unit 44, and a learning unit 45.

The camera control unit 41 causes the first camera 3A and the second camera 3B to execute imaging operation and includes an imaging control unit 41a and an image processing unit 41b. The imaging control unit 41a causes the first camera 3A to execute operation of capturing images of the inside of the first container 30 at the time of take-out of the workpiece W by the hand portion 26 and also to execute operation of capturing images including the hand portion 26 after the workpiece W take-out operation. Additionally, the imaging control unit 41a causes the second camera 3B to execute operation of capturing images of the inside of the second container 32 at the time of checking the workpiece W having been conveyed to the second container 32.

The image processing unit 41b generates image data including three-dimensional position information of the workpiece W by executing image processing of the images captured by the cameras 3A and 3B. The three-dimensional position information of the workpiece W is represented by a coordinate value (X, Y, Z) using, for example, an XYZ orthogonal coordinate system.

The robot control unit 42 causes the robot 2 (the hand portion 26) to execute workpiece W conveyance operation based on a conveyance condition set by the conveyance condition setting unit 43. The robot control unit 42 controls the driving motor of the robot 2 so as to execute the workpiece W conveyance operation according to the conveyance condition, i.e., to execute the workpiece W take-out (picking) operation and the transport operation and placement operation of the workpiece W (the transport operation and the placement operation are collectively referred to as placement operation in some cases). In a case where machine learning related to the workpiece W conveyance operation is executed in the learning unit 45, information related to how the robot control unit 42 has caused the robot 2 to operate is output to the learning unit 45.

The conveyance condition setting unit 43 sets, according to the workpiece W, conveyance conditions such as operation of the robot 2 at the time of conveying the workpiece W, matters to be prohibited, and the like. The conveyance condition is, for example, an agreement about a region of the workpiece W to be prohibited from being gripped by the hand portion 26. This point will be detailed later. This conveyance condition may be taught by an operator via an input unit (not shown), or may be acquired as a result of machine learning to be described later.

The storage unit 44 stores update of a conveyance condition set by the conveyance condition setting unit 43. In the storage unit 44, a table data is stored in which basic information to be described later and conveyance conditions are correlated with each other for a plurality (kinds) of workpieces W.

The learning unit 45 executes learning processing for learning operation of a robot 2. When setting the conveyance condition by machine learning, the learning unit 45 acquires, in each learning cycle, control information for control of the robot 2 by the robot control unit 42 and image data input from the camera control unit 41. Then, the learning unit 45 learns, from these pieces of information, optimum action pattern and conveyance condition of the robot 2 in a case of conveying the workpiece W. The action pattern is action of the robot 2 related to, for example, which position of the workpiece W should be gripped with which degree of a force (gripping force) by the hand portion 26 at the time of the picking operation of the workpiece W, at which degree of speed the hand portion 26 should be moved (transport speed) at the time of picking, transport, and placement operations of the workpiece W, and the like. As will be described later, the conveyance condition also includes elements of these actions. The learning unit 45 includes a quality observation unit 46, a compensation setting unit 47, and a value function updating unit 48. These will be detailed later.

[Workpiece W Conveyance Operation]

FIG. 3 is a flow chart for describing basic operation of the robot system 1. First, the control unit 4 acquires basic information such as a shape of the workpiece W, etc. (Step S1). The basic information is information such as a kind, a shape, a size, a surface state, and the like of the workpiece W, and the control unit 4 acquires the basic information by input operation by an operator via the input unit (not shown), or based on an imaging result obtained by the first camera 3A. The surface state represents surface treatment provided on the workpiece W, or the like.

Next, the conveyance condition setting unit 43 sets a workpiece W conveyance condition based on the basic information (Step S3). This conveyance condition may be taught by an operator via the input unit (not shown), or may be acquired as a result of machine learning, as described above.

Subsequently, the camera control unit 41 causes the first camera 3A to capture images of the inside of the first container 30, so that the robot control unit 42 specifies a workpiece W as a take-out target (which will be appropriately referred to as a target workpiece W) based on the image data (Step S5).

Then, the robot control unit 42 drives the robot 2 to execute the conveyance operation of taking out and conveying the target workpiece W from the first container 30 to the second container 32 (Step S7). In Steps S5 and S7, the robot control unit 42 specifies a workpiece W as a take-out target based on the conveyance condition set by the conveyance condition setting unit 43 and also executes the conveyance operation.

When the conveyance operation is completed, the camera control unit 41 causes the second camera 3B to capture images of the inside of the second container 32, so that a state of the workpiece W is recognized based on the image data (Step S9). At this time, in a case where the conveyance operation is considered inappropriate, such as a case where the workpiece W is not accommodated in the accommodation area 33, the robot control unit 42 controls a notification unit (not shown) to execute operation for notifying the operator of abnormality.

Next, the robot control unit 42 determines whether or not a predetermined number N of workpieces W has been conveyed from the first container 30 to the second container 32 (Step S11), and in a case where the predetermined number N of workpieces W has not been conveyed, shifts the processing to Step S5 to cause the robot 2 to execute the conveyance operation of a subsequent workpiece W. On the other hand, in a case where the predetermined number N of workpieces W has been conveyed from the first container 30 to the second container 32, the robot control unit 42 ends the present flow chart.

[Specific Example of Conveyance Condition]

Figure 4A:
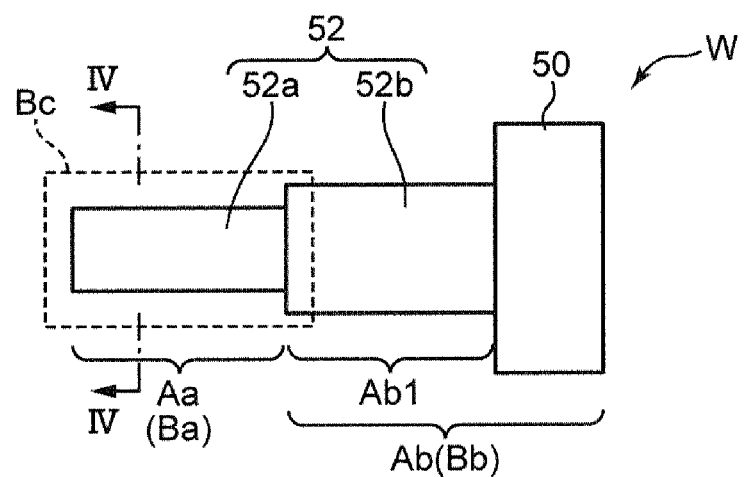
FIG. 4A is a plan view of a workpiece.
Figure 4B:
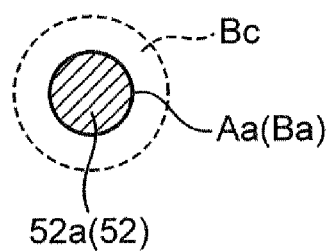
FIG. 4B is a sectional view of the workpiece (a sectional view of FIG. 4A taken along line IV-IV)

Specific examples of conveyance conditions set by the conveyance condition setting unit 43 will be described based on FIGS. 4A and 4B. FIGS. 4A and 4B are views for describing one example of a conveyance condition, FIG. 4A being a plan view of the workpiece W and FIG. 4B being a sectional view of the workpiece W (a sectional view of FIG. 4A taken along line IV-IV).

The workpiece W shown in FIG. 4A is, for example, a hexagon socket head cap screw (cap screw). This workpiece W (which will be appropriately referred to as a screw W) is provided with a head portion 50 having a hole portion for insertion of a wrench, and a shaft portion 52. The shaft portion 52 includes a screw portion 52a at a front end side and a non-screw portion (which will be referred to as a cylindrical portion 52b) at a head portion side. The conveyance condition setting unit 43 sets a conveyance condition for gripping and conveying the screw W by the hand portion 26 while ensuring quality of the screw W.

Specifically, in the screw W, the screw portion 52a is set as a grip prohibited region Aa which is prohibited from being gripped by the hand portion 26, and the remaining portion is set to be a grip allowed region Ab which is allowed to be gripped by the hand portion 26. In other words, at the time of conveyance of the workpiece W, the hand portion 26 is caused to grip the grip allowed region Ab. This prevents inconvenience of crush of a thread of the screw portion 52a caused by gripping of the screw portion by the hand portion 26.

Further, in the grip allowed region Ab, the conveyance condition setting unit 43 sets a portion corresponding to the cylindrical portion 52b to be a conditional region Ab1 which is conditionally allowed to be gripped. Specifically, the head portion 50 is preferentially gripped, and only when a predetermined condition is satisfied, the hand portion 26 is caused to grip the cylindrical portion 52b. A predetermined condition represents, for example, a case where the head portion 50 cannot be gripped by the hand portion 26 because the head portion is positioned at a corner portion of the first container 30. In this case, the hand portion 26 is caused to grip the cylindrical portion 52b. This is because when the cylindrical portion 52b being adjacent to the screw portion 52a is allowed to be gripped similarly to the head portion 50, a part of the screw portion 52a might be gripped by the hand portion 26 due to an operation error of the robot 2 and might have its thread damaged. This is also intended to suppress as much as possible, occurrence of inconvenience, such as damaging of the surface treatment of the cylindrical portion 52b by the hand portion 26, in such a case where the shaft portion 52 is subjected to special surface treatment.

The screw portion 52a is the grip prohibited region Aa and also a contact prohibited region Ba. The head portion 50 and the cylindrical portion 52b are the grip allowed region Ab and also a contact allowed region Bb. In other words, in a case where one screw W is a conveyance target object, the screw portion 52a of the one screw W is the grip prohibited region Aa and the remaining portion is the grip allowed region Ab. By contrast, as to a screw W other than the one screw W as the conveyance target object, the screw portion 52a is the contact prohibited region Ba whose contact by the hand portion 26 is prohibited and the other portion is the contact allowed region Bb whose contact by the hand portion 26 is prohibited. In other words, at the time of taking out a screw W by the hand portion 26, in the grip allowed region Ab of the screw W, a position not in contact with the screw portion 52a (the contact prohibited region Ba) of a screw W positioned therearound is to be gripped by the hand portion 26. This suppresses, at the time of taking out the screw W, damaging of the screw portion 52a of a screw W around the take-out target screw W by the hand portion 26. Accordingly, the conveyance condition setting unit 43 can be considered to set the grip prohibited region Aa and the grip allowed region Ab, as well as setting the contact prohibited region Ba and the contact allowed region Bb.

The conveyance condition setting unit 43 further sets a fixed space (a cylindrical space) around the screw W as an entry prohibited region Bc, the fixed space including a space from the front end portion of the cylindrical portion 52b to a front end of the screw portion 52a (see FIGS. 4A and 4B). The region Bc is a region into which the hand portion 26 is prohibited to enter. In other words, the hand portion 26 is prohibited from approaching the screw portion 52a of a screw W around the screw W to be a take-out target. This highly suppresses damaging of the screw portion 52a by the hand portion 26.

In addition to the above-described conveyance conditions, the conveyance condition setting unit 43 sets a conveyance condition that, in a case where a plurality of screws W overlap with each other, a screw W positioned at the highest position is preferentially taken out. The conveyance condition setting unit 43 also sets, as conveyance conditions, a grip position, a gripping force, and a transport speed at which the screw W can be reliably gripped and conveyed according to a shape of the screw W, surface treatment, and the like. At this time, the conveyance condition is set such that a gripping force and a transport speed in particular in a case of gripping the cylindrical portion 52b (the conditional region Ab1) are lower than a gripping force and a transport speed in case of gripping other portion (the head portion 50).

Figure 5:
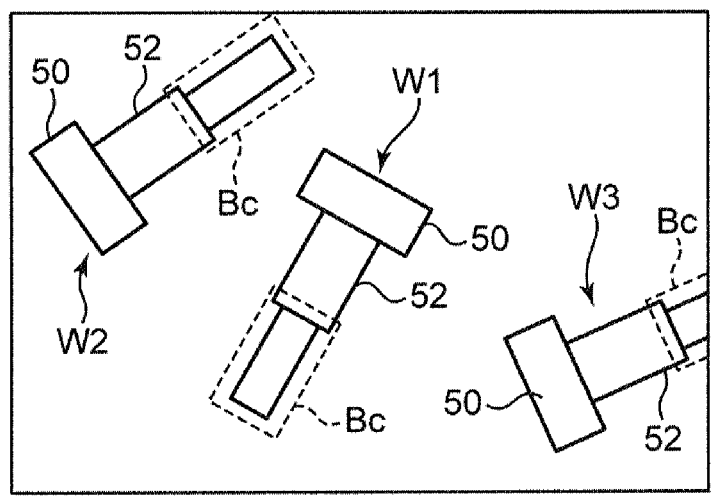
FIG. 5 is a schematic plan view showing one example of a workpiece accommodated in a first container.
Figure 6:
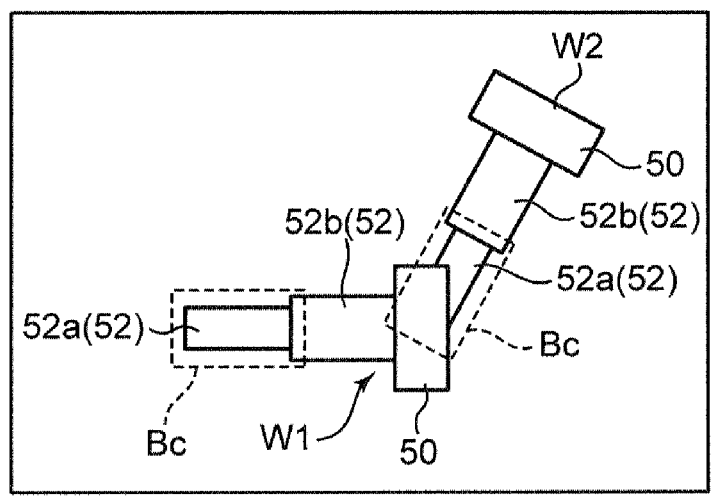
FIG. 6 is a schematic plan view showing one example of a workpiece accommodated in the first container.
Figure 7:
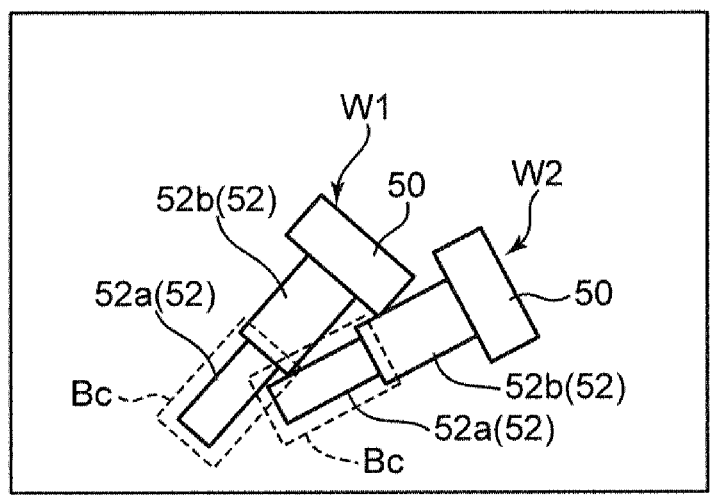
FIG. 7 is a schematic plan view showing one example of a workpiece accommodated in the first container.

Here, description will be made of an example of screw (workpiece) W take-out operation by the robot 2 based on the above conveyance conditions with reference to FIG. 5 to FIG. 7. FIG. 5 to FIG. 7 are schematic plan views showing a screw W accommodated in the first container 30.

In the example of FIG. 5, a plurality of screws W1 to W3 are arranged apart from each other. In detail, the screws W1 to W3 each allow the head portion 50 to be gripped by the hand portion 26, and in a case where any screw W of the screws W1 to W3 is being gripped at the head portion 50, the screws are spaced apart from each other by a distance which prevents the hand portion 26 from entering the entry prohibited region Bc of other screw W. Accordingly, in such a case, the robot 2 grips, with the hand portion 26, the head portion 50 of any one of the screws W1 to W3 and takes out the screw from the first container 30.

In the example of FIG. 6, the screws W1 and W2 are arranged to be overlapped with each other. Specifically, on the screw portion 52a of one screw W2, the head portion 50 of the other screw W1 overlaps. In this case, when the head portion 50 of the higher-position screw W1 is to be gripped by the hand portion 26, the hand portion 26 might enter the entry prohibited region Bc of the lower-position screw W2 to contact its screw portion 52a (the contact prohibited region Ba). Accordingly, in such a case, the robot 2 grips the cylindrical portion 52b (the grip allowed region Ab1) of the screw W2 by the hand portion 26 to take out the screw W1 from the first container 30. At this time, the robot 2 grips the cylindrical portion 52b by a gripping force which is set as the conveyance condition, the gripping force being lower than a gripping force for gripping the head portion 50.

In the example of FIG. 7, although the screws W1 and W2 are not overlapped with each other, the head portion 50 and the cylindrical portion 52b of one screw W1 are in contact with the cylindrical portion 52b and the screw portion 52a of the other screw W2. In this case, when the head portion 50 or the cylindrical portion 52b (the conditional region Ab1) of the one screw W1 is to be gripped by the hand portion 26, the hand portion 26 might enter the entry prohibited region Bc of the other screw W2. On the other hand, the head portion 50 of the other screw W2 has its surroundings widely opened. Accordingly, in such a case, the robot 2 grips the head portion 50 of the screw W2 by the hand portion 26 to take out the screw W2 from the first container 30.

FIG. 4A to FIG. 7 illustrate the grip prohibited region Aa (the contact prohibited region Ba), the grip allowed regions Ab and Ab1 (the contact allowed region Bb), and the entry prohibited region Bc in a case where the workpiece W is a hexagon socket head cap screw. Accordingly, it goes without saying that with a workpiece W of a different kind or size, positions or areas of these regions differ from each other. As to a workpiece W subjected to surface treatment, for example, mirror-finish treatment, the conveyance condition setting unit 43 sets the grip prohibited region Aa (the contact prohibited region Ba) or the entry prohibited region Bc according to a kind, a position, or the like of the surface treatment.

[As to Machine Learning]

Next, description will be made of a configuration of the learning unit 45 and also of an example of setting a conveyance condition by the conveyance condition setting unit 43 based on machine learning of the learning unit 45.

<Configuration of Learning Unit>

The learning unit 45 learns optimum action pattern and conveyance condition of the robot 2 for conveying the workpiece W from control information of the robot 2 obtained when certain conveyance operation has been executed and quality information of the workpiece W for which the conveyance operation has been executed. Here, "quality information" is information mainly representing a state of a surface (outer appearance) of the workpiece W after conveyance. A learning result acquired by the learning unit 45 will be reflected in a conveyance condition set by the conveyance condition setting unit 43.

As a learning method, which is not particularly limited, for example, "supervised learning", "unsupervised learning", "reinforcement learning" and the like can be adopted. In the present embodiment, as a learning method in the learning unit 45, a Q learning method is adopted as the reinforcement learning. The Q learning is a method in which successive operations of the robot 2 are divided into a plurality of states to learn, as to action of the robot 2, a highly valuable action which can obtain a compensation when the state is sequentially shifted. Additionally, the Q learning as reinforcement learning to be executed by the learning unit 45 can be realized by using, for example, a neural network. The neural network has a configuration imitating a structure of a human brain, in which logic circuits imitating functions of neurons in the human brain are multi-layered.

The learning unit 45 includes the quality observation unit 46, the compensation setting unit 47, and the value function updating unit 48 as described above (FIG. 1).

The quality observation unit 46 compares image data of the workpiece W before conveyance (hereinafter, referred to as pre-conveyance image data) and image data of the workpiece W after conveyance (hereinafter, referred to as post-conveyance image data) to evaluate quality of the workpiece W (hereinafter, referred to as workpiece quality evaluation). Pre-conveyance image data is image data including information of a three-dimensional position (X, Y, Z coordinate value) of a workpiece W as a target, and for this image data, there is used an image acquired by capturing a workpiece W in advance separately from the robot system 1, or an image acquired by capturing the inside of the first container 30 by the first camera 3A.

Specifically, the quality observation unit 46 compares image data before and after conveyance, specifies presence or absence of a grip trace or a scratch (hereinafter, simply referred to as a scratch), a position of a scratch, a size of a scratch made during the conveyance, etc., and conducts 3-stage evaluation (evaluations A to C) based on a state of the scratch (see FIG. 8). For example, in a case where no scratch is made during the conveyance, workpiece quality is evaluated as "A" and in a case where a large scratch is made, workpiece quality is evaluated as "C". Also, even in a case of a small scratch, when the scratch is positioned in the screw portion 52a (the grip prohibited region Aa) of the workpiece W, workpiece quality is evaluated as "C".

The quality observation unit 46 also evaluates the quality of the picking operation by the hand portion 26 (hereinafter, referred to as picking evaluation) based on image data including the hand portion 26 immediately after take-out of a workpiece from the first container 30 (hereinafter, referred to as post-take-out image data), and evaluates the quality of the workpiece W placement operation (hereinafter, referred to as placement evaluation) based on the post-conveyance image data. As the post-take-out image data, there is used an image acquired by capturing a region including the hand portion 26 by the first camera 3A after the workpiece W take-out operation executed by the hand portion 26.

Specifically, the quality observation unit 46 specifies a grip position or a grip attitude of a workpiece W gripped by the hand portion 26 based on the post-take-out image data to conduct 3-stage evaluation (evaluations A to C) as the picking evaluation (see FIG. 8). For example, in a case where the hand portion 26 appropriately grips the workpiece W only at the grip allowed region Ab, the picking evaluation is set to be "A" and in a case where the hand portion 26 grips the workpiece W while entering the grip prohibited region Aa, the picking evaluation is set to be "B" or "C" according to the degree of the entry.

The quality observation unit 46 also specifies a position or an attitude of a workpiece W after conveyance based on the post-conveyance image data to conduct 3-stage evaluation (evaluations A to C) as the placement evaluation (see FIG. 8). For example, in a case where the workpiece W is placed in a fixed attitude in the accommodation area 33 of the second container 32, the quality observation unit 46 sets the placement evaluation to be "A", and in a case where the workpiece W is arranged in an attitude different from the fixed attitude, or the workpiece W is outside the accommodation area 33, or the like, the quality observation unit 46 sets the placement evaluation to be "B" or "C".

Although in the present embodiment, the quality observation unit 46 conducts 3-stage evaluation for each of the picking evaluation, the placement evaluation, and the workpiece quality evaluation, each evaluation is not limited to 3 stages.

The compensation setting unit 47 associates conveyance operation (an action pattern) executed by the robot 2 with quality of the workpiece W conveyed according to the action pattern, to execute processing of giving a compensation R to the action pattern. Specifically, the compensation setting unit 47 acquires, from the robot control unit 42, control data of an action pattern that the robot 2 has been caused to execute at the time of conveyance of a certain workpiece W. The compensation setting unit 47 also acquires data of an evaluation result derived by the quality observation unit 46 regarding the workpiece W conveyed according to the action pattern. Based on the control data of the action pattern and the data of the evaluation result, the compensation R is given to the action pattern. In detail, the compensation R is given to each action element constituting the action pattern. The action elements include "grip position", "gripping force" and "transport speed". "Grip position" represents a position of the hand portion 26 with respect to a workpiece W when the hand portion 26 grips the workpiece W, "gripping force" represents a magnitude of a force W when the hand portion 26 grips the workpiece W, and "transport speed" represents a moving speed of the hand portion 26 at the time of transporting a taken out workpiece W. These action elements are also conveyance conditions as described above.

The higher the picking evaluation, the placement evaluation, and the workpiece quality evaluation become, the larger a value to be given to the compensation R becomes. In this example, the compensation R is given based on, e.g. the compensation table shown in FIG. 8. The picking evaluation, the placement evaluation, and the workpiece quality evaluation are each set to have 3-stage evaluation (evaluations A to C) as described above, and the compensation table is defined by a matrix table with the picking evaluation and the placement evaluation shown in vertical items and the workpiece quality evaluation shown in the horizontal item. In other words, the compensation R is determined by a combination of the picking evaluation and the placement evaluation, and the workpiece quality evaluation.

In more detail, as shown in FIG. 8, compensations ($Ra_{11}$ to $Ra_{33}$) for the action patterns of the robot 2 in the picking operation by the hand portion 26 are determined by a combination of a picking evaluation and a workpiece quality evaluation, and compensations ($Rb_{11}$ to $Rb_{33}$) for the action patterns of the robot 2 in the placement operation are determined by a combination of a placement evaluation and a workpiece W quality evaluation.

The compensations ($Ra_{11}$ to $Ra_{33}$) for the action patterns of the picking operation are set, for example, for each action element constituting the action pattern, i.e., for each of "gripping force" and "grip position" as shown in FIGS. 9A and 9B. FIG. 9A illustrates the compensation R of each action element in a case where the picking evaluation and the workpiece quality evaluation are both evaluation A, and FIG. 9B illustrates the compensation R of each action element in a case where the picking evaluation is evaluation A and the workpiece quality evaluation is evaluation C.

The compensations ($Rb_{11}$ to $Rb_{33}$) for the action patterns of the placement operation are set, for example, for each action element constituting the action pattern, i.e., for each of "gripping force", "grip position" and "conveyance speed" as shown in FIGS. 10A and 10B. FIG. 10A illustrates the compensation R of each action element in a case where the placement evaluation and the workpiece quality evaluation are both evaluation A, and FIG. 10B illustrates the compensation R of each action element in a case where the placement evaluation is evaluation A and the workpiece quality evaluation is evaluation C.

As described above, the higher the picking evaluation, the placement evaluation, and the workpiece quality evaluation become, the larger a value to be given to the compensation R of each action element becomes, and further, the higher the transport speed of a workpiece W becomes, the larger a value to be given to the compensation becomes. In this manner, the learning unit 45 learns such an action pattern of the conveyance operation of the robot 2 as enabling a transport speed to become faster as soon as possible.

The value function updating unit 48 updates a value function which defines a value Q(s, a) of an action pattern of the robot 2 according to the compensations R set by the compensation setting unit 47. The value function updating unit 48 updates the value function using an update formula for the value Q(s, a) shown in the Formula (1) below.

[Formula 1]

$$Q(s, a) \approx Q(s, a) + \alpha\left(R(s, a) + \gamma \max_{a'} Q(s', a') - Q(s, a)\right) \quad (1)$$

In the Formula (1), "s" represents a state of the robot 2 and "a" represents an action of the robot 2 according to an action pattern. By the action "a", the state of the robot 2 shifts from the state "s" to a state "s'". R(s, a) represents a compensation R obtained by the state shift. The term to which "max" is attached is obtained by multiplication of a value Q (s', a') by "γ", the value Q (s', a') being in a case where a most valuable action "a'" is selected in the state "s'". Here, "γ" is a parameter called an attenuation rate, which is to be within a range of 0<γ≤1 (e.g. 0.9). In addition, "α" is a parameter called a learning rate, which is to be within a range of 0<α≤1 (e.g. 0.1).

The Formula (1) represents an update formula for updating the value Q(s, a) for the action "a" in the state "s" based on the compensation R(s, a) set by the compensation setting unit 47 for the action "a". Specifically, the Formula (1) shows that when a total value of the value Q (s', a') and the compensation R(s, a) for the action "a'" in the state "s'" is larger than the value Q(s, a) for the action "a" in the state "s", the value Q(s, a) is increased and on the contrary when the total value is smaller, the value Q(s, a) is reduced. In other words, by updating a value function by the update formula shown in the Formula (1), the value function updating unit 48 approximates a value Q(s, a) for a certain action "a" in a certain state "s" to a compensation R set for the action "a" and to a value Q (s', a') for a best action "a'" in a next state "s'" caused by the action "a".

<Machine Learning Processing>

Figure 11:
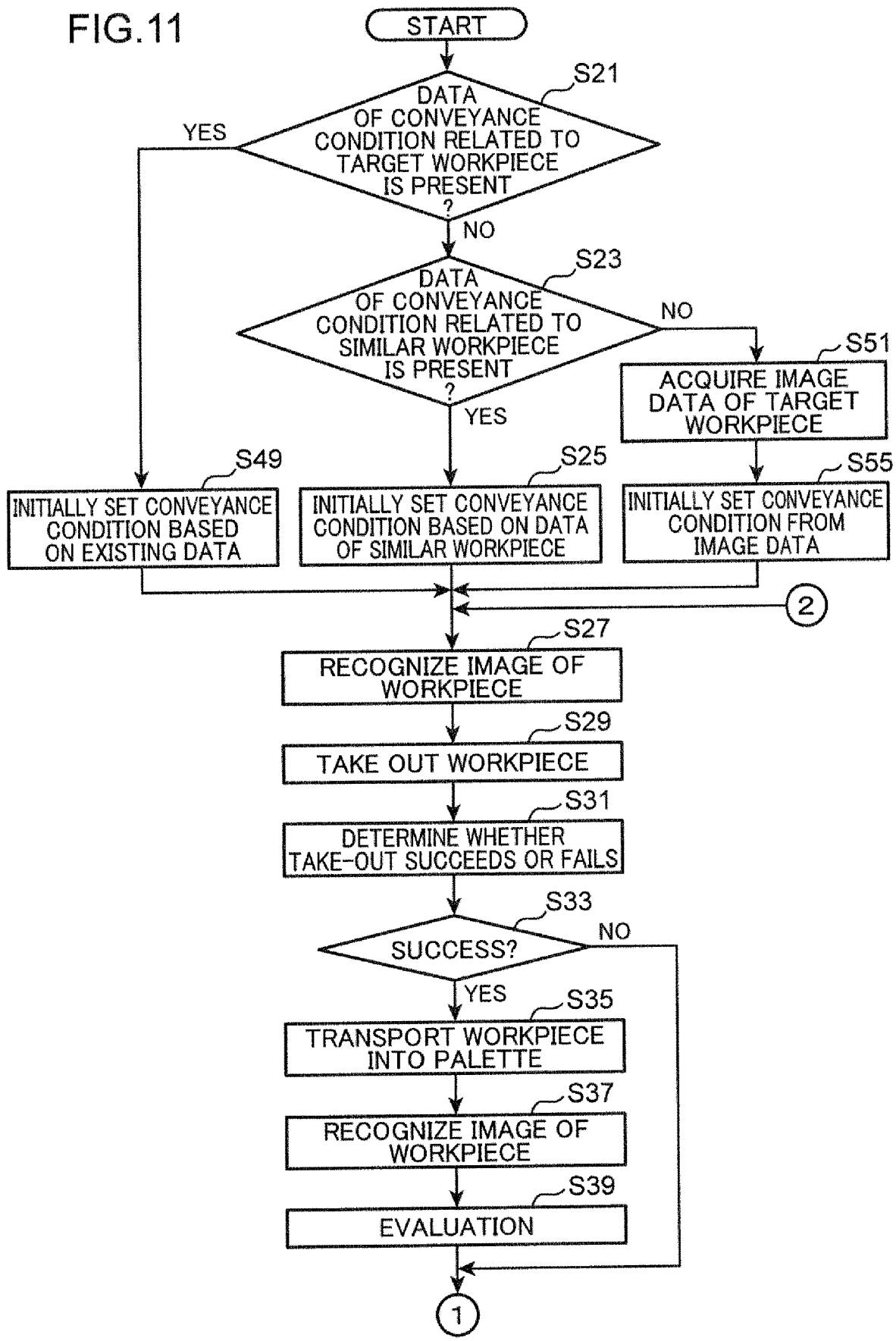
FIG. 11 is a flow chart showing one example of conveyance condition learning operation.
Figure 12:
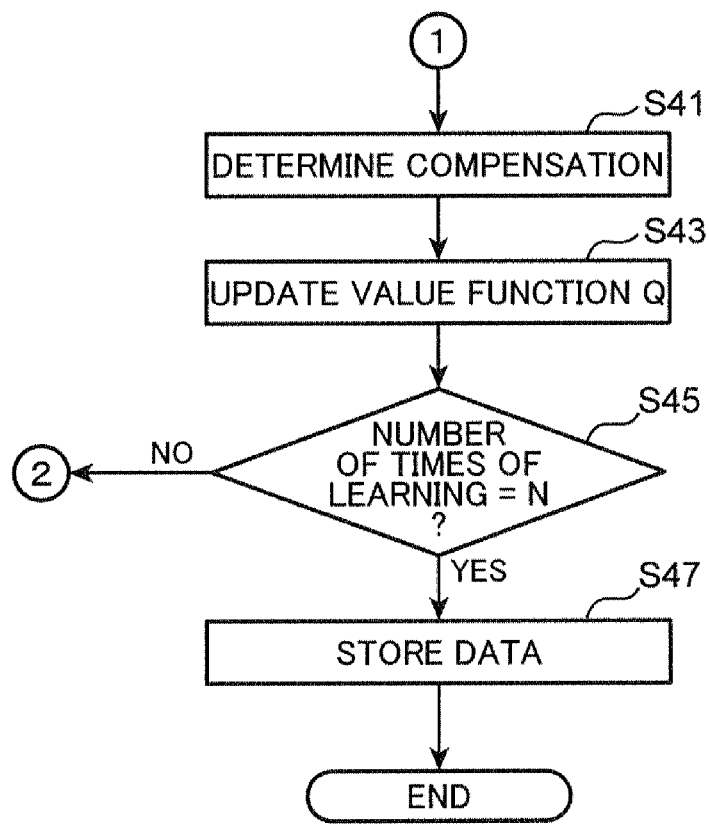
FIG. 12 is a flow chart (continuation of FIG. 11) showing one example of conveyance condition learning operation.

FIG. 11 and FIG. 12 are flow charts showing one example of conveyance condition learning operation. First, the conveyance condition setting unit 43 of the control unit 4 determines whether or not data of a conveyance condition related to a target workpiece W is already stored in the storage unit 44 (Step S21). In a case where the data is stored, the conveyance condition setting unit 43 initially sets the stored existing data as a conveyance condition (Step S49). Such a case is assumed to be a case of again learning an existing conveyance condition for the target workpiece W obtained by former learning, a case of initially setting data by using default data of a conveyance condition originally stored in the storage unit 44 and execute learning, and the like.

In a case where no existing data is stored in the storage unit 44 (No in Step S21), the conveyance condition setting unit 43 determines whether or not data of a conveyance condition related to a similar workpiece is stored in the storage unit 44 (Step S23). In a case where the data is stored, the conveyance condition setting unit 43 initially sets a conveyance condition of the target workpiece W based on the data of the conveyance condition related to the similar workpiece W. The similar workpiece W is a workpiece W having a common shape to the target workpiece W. The conveyance condition setting unit 43 compares the above-described basic information of the target workpiece and basic information of the workpiece W stored in the storage unit 44, specifies, as a similar workpiece W, a workpiece W satisfying common points set in advance regarding shapes of the both workpieces, and estimates a conveyance condition for the target workpiece W based on the conveyance condition for the similar workpiece. For example, in a case where the target workpiece W is the above-described hexagon socket head cap screw, a screw having a length different from the cap screw or a screw having a different diameter is considered to be a similar workpiece. In this robot system 1, since a conveyance condition of a target workpiece W is initially set using an existing conveyance condition of a similar workpiece W, labor for programming a conveyance condition from the beginning is saved.

In a case where data of a conveyance condition related to the similar workpiece is not stored in the storage unit 44 (No in Step S23), the conveyance condition setting unit 43 acquires image data of the target workpiece W (Step S51), and initially sets the conveyance condition for the target workpiece W based on the image data (Step S55). For example, the conveyance condition setting unit 43 specifies a shape of the workpiece W from a point group density of image data (image data including three-dimensional position information), etc., estimates the grip prohibited region Aa, the contact allowed region Bb, and the entry prohibited region Bc based on the shape, and also estimates a "grip position", a "gripping force", and a "conveyance speed" of the workpiece W by the hand portion 26. In this manner, the conveyance condition is initially set. In a case where image data is given in advance by an operator via the input unit (not shown), this image data is used, and otherwise, image data is acquired by capturing the inside of the first container 30 by the first camera 3A via the camera control unit 41.

Thus, a conveyance condition for the target workpiece W is initially set by any of the processing in Steps S25, S49, and S55. Specifically, the grip prohibited region Aa (the contact prohibited region Ba), the grip allowed region Ab (the contact allowed region Bb), and the entry prohibited region Bc of the target workpiece W are determined, and also the "grip position", the "gripping force", and the "conveyance speed" of the workpiece W by the hand portion 26 are determined. The foregoing processing in Steps S21 to S25, and S49 to S55 is advance preparation for the learning processing, in which the conveyance conditions initially set in Steps S25, S49, and S55 are modified according to the learning result obtained by the learning processing in Step S27 and the subsequent steps.

In the learning processing, first, image data in the first container 30 is acquired by the first camera 3A, and three-dimensional position information of a workpiece W is acquired by object recognizing processing by the image processing unit 41b (Step S27). As a result, position information (a coordinate value) of a workpiece W in the first container 30 is acquired, the workpiece W to be taken out, and the position information is given to the robot control unit 42. The quality observation unit 46 of the learning unit 45 acquires image data including such three-dimensional position information of the workpiece W from the camera control unit 41 as the pre-conveyance image data.

The robot control unit 42 causes the robot 2 to operate based on the conveyance condition set by the conveyance condition setting unit 43 and the position information of the workpiece W acquired by the object recognition, also causes the robot to take out the workpiece W from the first container 30 in consideration of the conveyance conditions of the respective prohibited regions Aa, Ba, Bc, and the like (Step S29). Then, the camera control unit 41 causes the first camera 3A to capture an image of the workpiece W gripped by the hand portion 26 of the robot 2, and based on the obtained image data, the control unit 4 determines whether or not the workpiece W is gripped by the hand portion 26 (Steps S31 and S33). The quality observation unit 46 of the learning unit 45 acquires image data of thus gripped workpiece W from the camera control unit 41 as the post-take-out image data.

In a case where the workpiece W is gripped (Yes in Step S33), the robot control unit 42 drives the robot 2 to transport the taken out workpiece W to the second container 32 and causes the robot to release (release gripping) the workpiece W at a predetermined XYZ position (Step S35). In this manner, conveyance of the workpiece W from the first container 30 to the second container 32 is completed.

Upon completion of the conveyance of the workpiece W, image data of the inside of the second container 32 is acquired by the second camera 3B, and image data including three-dimensional position information of the workpiece W is acquired by the object recognizing processing by the image processing unit 41b (Step S37). The quality observation unit 46 of the learning unit 45 acquires such image data including the three-dimensional position information of the workpiece W from the camera control unit 41 as the post-conveyance image data. In a case where the workpiece W is not gripped (No in Step S33), the processing is shifted to Step S41 to be described later.

Next, the quality observation unit 46 conducts the picking evaluation based on the post-take-out image data acquired in Step S31 and also conducts the placement evaluation based on the post-conveyance image data acquired in Step S37, and further, compares the post-conveyance image data acquired in Step S37 and the pre-conveyance image data acquired in Step S27 to conduct the workpiece quality evaluation (Step S39).

Subsequently, the compensation setting unit 47 gives the compensation R based on success or failure of the picking operation and the evaluation result obtained by the quality observation unit 46 and based on this action pattern of the robot 2. The compensation R is determined based on the compensation table shown in FIG. 8. In this case, the compensation ($Ra_{11}$ to $Ra_{33}$) for an action pattern of the picking operation is given to each action element constituting the action pattern. Specifically, with reference to FIGS. 9A and 9B, in a case where both the picking evaluation and the workpiece quality evaluation have the evaluation A, the compensation setting unit 47 gives a compensation "100" to the action patterns "gripping force" and "grip position". In a case where the picking evaluation has the evaluation A and the workpiece quality evaluation has the evaluation C, the compensation setting unit 47 gives a compensation "0; zero" to the action pattern "gripping force" and a compensation "60" to the "grip position".

Similarly, the compensation ($Rb_{11}$ to $Rb_{33}$) for an action pattern of the placement operation is given to each action element constituting the action pattern. Specifically, with reference to FIG. 10A and FIG. 10B, in a case where both the placement evaluation and the workpiece quality evaluation have the evaluation A, the compensation setting unit 47 gives the compensation "100" to each of the action patterns "gripping force", "transport speed", and "grip position". In a case where the placement evaluation has the evaluation A and the workpiece quality evaluation has the evaluation C, the compensation setting unit 47 gives the compensation "0" to each of the action patterns "gripping force" and "transport speed" and gives the compensation "60" to the "grip position".

In a case where no workpiece W is gripped in Step S33, the compensation setting unit 47 gives the compensation "0" to each of the action patterns "gripping force" and "grip position" for the picking operation and gives the compensation "0" to each of the action patterns "gripping force", "transport speed", and "grip position" for the placement operation irrespective of the compensation table shown in FIG. 8.

Thereafter, the value function updating unit 48 updates a value function which defines the value Q(s, a) of an action pattern of the robot 2 using the update formula shown in the Formula (1) (Step S43). In detail, the value function updating unit 48 updates a value function which defines a value Q(s, a) of each action element for an action pattern of the picking operation based on a compensation ($Ra_{11}$ to $Ra_{33}$) for each action element for the action pattern of the picking operation, as well as updating a value function which defines a value Q(s, a) of each action element for an action pattern of the placement operation based on a compensation ($Rb_{11}$ to $Rb_{33}$) for each action element for the action pattern of the placement operation.

Each processing shown in Steps S27 to S43 is processing to be executed in one cycle of the learning processing by the learning unit 45. The learning unit 45 determines whether or not the number of times of learning reaches the predetermined number N of times (Step S45). In a case where the number of times of learning does not reach the predetermined number N of times (No in Step S45), the learning unit 45 shifts the processing to Step S27 to cause take-out of a subsequent workpiece W from the first container 30 and repeat the learning processing. By contrast, in a case where the number of times of learning reaches the predetermined number N of times (Yes in Step S45), the learning unit 45 ends the learning processing, and the conveyance condition setting unit 43 stores, in the storage unit 44, a learning result, i.e. data of a conveyance condition which is ultimately obtained (Step S47) to end the present flow chart. In this case, if data of a conveyance condition of a target workpiece W is not stored in the storage unit 44, after modifying an initially set conveyance condition based on the learning result, the conveyance condition setting unit 43 newly stores the conveyance condition in the storage unit 44 together with the above basic information of the target workpiece W, and in a case where data of the conveyance condition of the target workpiece W is already stored in the storage unit 44, overwrites existing data with data of the modified conveyance condition.

<Functions and Effects of Learning>

As described in the foregoing, a conveyance condition which enables execution of more ideal workpiece conveyance operation is searched for by the execution of the learning processing by the learning unit 45, so that a conveyance condition initially set in Steps S49, S25, and S55 will be modified by the conveyance condition setting unit 43. As to, for example, an initially set "grip position", in a case where the hand portion 26 repeatedly fails in taking out a workpiece W and therefore cannot obtain high picking evaluation or placement evaluation, a "grip position" at which higher picking evaluation can be obtained will be searched for by the learning processing. In this case, the conveyance condition setting unit 43, for example, expands and modifies an initially set "grip prohibited region Aa" such that the initially set "grip position" is included in the grip prohibited region Aa. This enables more ideal conveyance condition to be set under which take-out of a workpiece W hardly fails.

Additionally, as described above, the value function updating unit 48 applies a larger value compensation R as a transport speed of a workpiece W is increased. In other words, the learning unit 45 will learn, within the grip allowed region Ab, a gripping force or a grip position at which a transport speed becomes higher as soon as possible. Accordingly, such a conveyance condition will be set which enables a workpiece W to be conveyed more quickly from the first container 30 to the second container 32. For example, although in a certain learning cycle, a "gripping force" and a "transport speed" as action elements of an action pattern for the placement operation are set to have the maximum values, in a case where a workpiece W has a deep grip trace and therefore has a low workpiece quality evaluation, the learning unit 45 sets the next "gripping force" in the subsequent learning cycle to be lower than the former "gripping force". As a result, although the workpiece W no more has a grip trace, for example, in a case where the workpiece W is out of position in the second container 32, i.e., in a case where a "transport speed" is too high relative to a "gripping force", the learning unit 45 sets the "transport speed" in a further subsequent learning cycle to be lower than the former "transport speed". Although the description has been made here of a relationship between a "gripping force" and a "transport speed", the learning unit 45 learns also about a "grip position" in the same manner. As a result, the learning unit 45 will learn, within the grip allowed region Ab, a gripping force and a grip position at which a transport speed becomes higher as soon as possible within a range where the workpiece W can be appropriately conveyed.

[Modification Example and Others]

The robot system 1 is illustrative of a preferred embodiment of the robot system according to the present disclosure, and the specific configuration of the system can be changed without departing from the gist of the present disclosure. For example, the following modes can be adopted.

(1) The robot 2 may selectively and automatically exchange a tool (a pair of pawl portions in the embodiment) of the hand portion 26 for gripping a workpiece W from among a plurality of tools. In this case, the conveyance condition setting unit 43 sets which tool to be used as a conveyance condition, so that the learning unit 45 learns an optimum tool based on machine learning. According to such a configuration, execution of the workpiece W conveyance operation by an optimum tool enables the workpiece W to be conveyed while ensuring high quality for the workpiece W.

(2) In the above-described embodiment, the conveyance condition setting unit 43 initially sets a conveyance condition based on any of existing data of a workpiece W, existing data of a similar workpiece W, and image data of the workpiece W acquired via the first camera 3A (Steps S49, S25, and S55 in FIG. 11). However, a conveyance condition can be set based on other information. For example, in a case where the conveyance condition setting unit 43 can acquire the above-described basic information such as a case where the basic information of the workpiece W is taught by an operator via the input unit (not shown) and is stored in the control unit 4, a conveyance condition may be set based on the basic information. In particular, it is difficult to recognize, from image data, information related to a surface state such as surface treatment applied to a workpiece W among the basic information. Therefore, information related to the surface state is stored in the control unit 4 in advance, and the conveyance condition setting unit 43 sets the grip prohibited region Aa (the contact prohibited region Ba) and the entry prohibited region Bc based on the information related to the surface state.

(3) In the above-described embodiment, the compensation ($Ra_{11}$ to $Ra_{33}$) for each action pattern of the picking operation and the placement operation is given to each action element constituting the action pattern. However, the compensation ($Ra_{11}$ to $Ra_{33}$) for each action pattern can be a total of compensations for the respective action elements constituting the action pattern. Specifically, with reference to FIGS. 9A and 9B, in a case where both the picking evaluation and the workpiece quality evaluation have the evaluation A, the compensation setting unit 47 may give a compensation "200" to the action pattern, and in a case where the picking evaluation has the evaluation A and the workpiece quality evaluation has the evaluation C, the compensation setting unit 47 may give the compensation "60" to the action pattern. Similarly, the compensation ($Rb_{11}$ to $Rb_{33}$) for an action pattern of the placement operation can be a total of compensations for the respective action elements constituting the action pattern. Specifically, with reference to FIG. 10A and FIG. 10B, in a case where both the placement evaluation and the workpiece quality evaluation have the evaluation A, the compensation setting unit 47 may give a compensation "300" and in a case where the placement evaluation has the evaluation A and the workpiece quality evaluation has the evaluation C, the compensation setting unit 47 may give the compensation "60".

Figure 14:
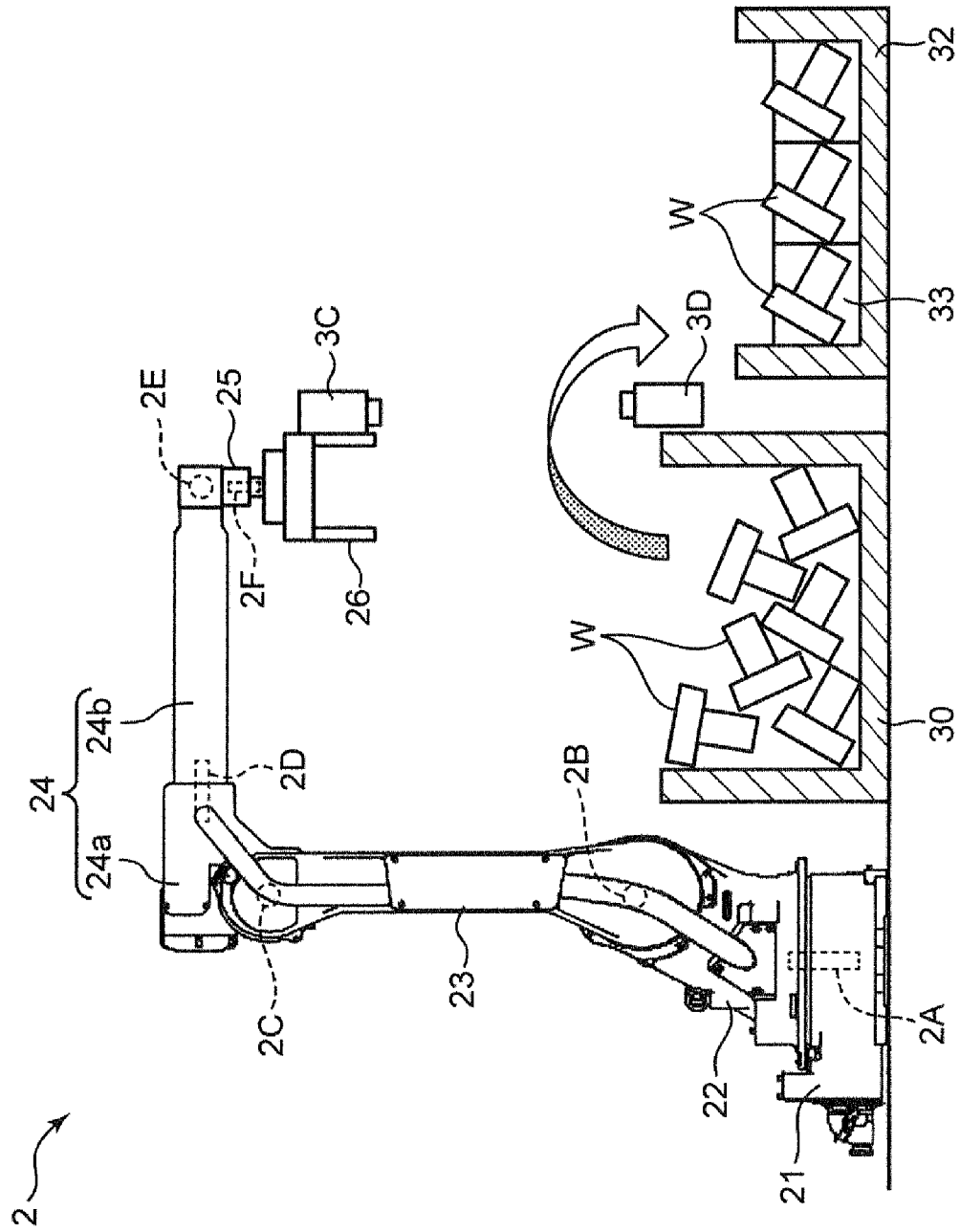
FIG. 14 is a view showing a configuration of a robot system according to a modification example.

(4) In the above-described embodiment, as the imaging unit which acquires image data of a workpiece W for the initially setting of a conveyance condition, i.e., as the first imaging unit of the present disclosure, the first camera 3A arranged (fixed) above the first container 30 is applied. However, as shown in FIG. 14, as the first imaging unit, a camera 3C may be provided at a movable portion of the robot 2 such as the hand portion 26 so that the camera 3C captures an image of a workpiece W in the first container 30 before execution of the conveyance operation. Also, as shown in FIG. 14, as the first imaging unit, a camera 3D may be upwardly arranged (fixed) at a position between the first container 30 and the second container 32 so that the camera 3D captures an image of a workpiece W which is taken out from the first container 30 and which is in a state of being gripped by the hand portion 26.

Also in the above-described embodiment, as the imaging unit which captures an image of a workpiece W having been conveyed to the second container 32, i.e., as the second imaging unit of the present disclosure, the second camera 3B arranged (fixed) above the second container 32 is applied. However, as the second imaging unit, the camera 3C as shown in FIG. 14 may capture an image of a workpiece W in the second container 32 after execution of the conveyance operation.

(5) It may be possible to capture, by the first camera 3A (the third imaging unit), an image of the inside of the first container 30 from which a workpiece has been taken out by the hand portion 26 and evaluate the quality of the picking operation by the hand portion 26 based on image data (referred to as other workpiece image data) in addition to the post-take-out image data (or separately from the post-take-out image data). In other words, when the hand portion 26 takes out a target workpiece W, an influence to be exerted on other workpiece around the target workpiece W may be considered. In this case, based on the pre-conveyance image data acquired by capturing the inside of the first container 30 by the first camera 3A, and other workpiece image data, the quality observation unit 46 specifies an influence exerted by the hand portion 26 on other workpiece W, specifically, displacement of other workpiece W, a scratch formed on that other workpiece W, and the like to conduct the picking evaluation. This configuration enables a conveyance condition to be searched for under which not only quality of a workpiece W as a take-out target but also quality of other workpiece W at the time of taking out can be maintained.

In this configuration, as the imaging unit which captures an image of the inside of the first container 30 from which a workpiece has been taken out by the hand portion 26, i.e., as the third imaging unit of the present disclosure, the first camera 3A arranged (fixed) above the first container 30 is applied. The first camera 3A functions also as the first imaging unit and the third imaging unit of the present disclosure. However, as the third imaging unit, the camera 3C as shown in FIG. 14 may capture an image of a workpiece W in the first container 30. In this case, the camera 3C may function also as the first imaging unit and the third imaging unit in the present disclosure.

In this modification example (5), it is further possible that the conveyance condition setting unit 43 sets, as a conveyance condition, an approaching method such as contacting or separating of the hand portion 26 with/from a workpiece W at the time of taking out the workpiece W from the first container 30, the storage unit 44 stores other workpiece image data, and a success/failure of the picking operation and a picking evaluation (hereinafter, referred to as a picking operation result), and the learning unit 45 learns an optimum approaching method based on an image of the inside of the first container 30 captured by the first camera 3A (an image including a target workpiece W as a take-out target) and a result of past picking operation. Approaching methods include a moving speed of the hand portion 26 at the time of contacting or separating with/from a target workpiece W as a take-out target, and a movement direction specified by an XYZ orthogonal coordinate system. In other words, in a case where image data captured by the first camera 3A is image data of a past picking operation result stored in the storage unit 44 and is similar to image data recognized to show a failure of conveyance operation, the approaching method may be changed. Possible examples of a failure of conveyance operation include a case of a failure in the picking operation (a case of being determined as No in the processing in Step S33 of FIG. 11, such as a failure in gripping a workpiece W, drop-off of a workpiece W during take-out, and the like), and a case of having a low evaluation (the evaluation C) in the picking evaluation. Such a configuration enables an approaching method to be searched for by which at the time of taking out a workpiece W, quality of other workpiece W can be maintained to be higher. In this configuration, the storage unit 44 functions as first and second storage units of the present disclosure and the first camera 3A functions as the first and third imaging units of the present disclosure. The first and third imaging units are not limited to the first camera 3A but may be the camera 3C as shown in FIG. 14. Additionally, although in the present example, image data is used as "workpiece arrangement information" according to the present disclosure, the workpiece arrangement information is not limited to image data and any information other than image data can be used as long as the information can specify arrangement of each workpiece W in the first container 30. The workpiece arrangement information may be, for example, three-dimensional position information of each workpiece W in the first container 30. Specifically, the approaching method may be changed in a case where three-dimensional position information of each workpiece W acquired from image data captured by the first camera 3A is three-dimensional position information of each of past workpieces W stored in the storage unit 44 and is similar to three-dimensional position information of each workpiece W whose conveyance operation is recognized to fail. As a matter of course, two-dimensional position information may be used as workpiece arrangement information in place of three-dimensional position information.

Figure 13:
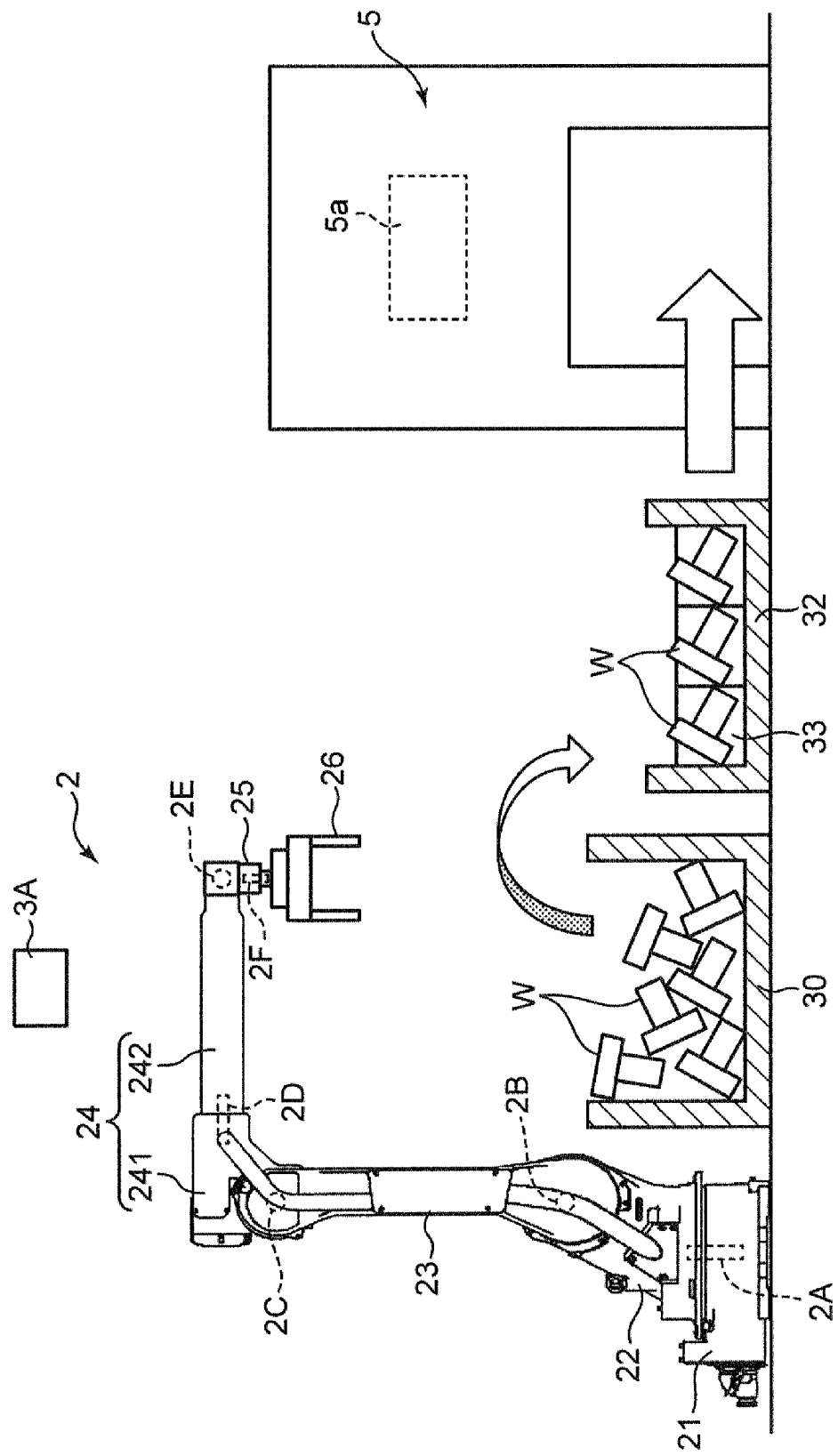
FIG. 13 is a view showing a configuration of a robot system according to a modification example.

(6) The robot system 1 of the above-described embodiment includes a dedicated imaging unit (the second camera 3B) as an imaging unit for acquiring the post-conveyance image data. However, for example, as shown in FIG. 13, in a case where the robot system 1 includes a test device 5 provided with a three-dimensional measuring device 5a which captures an image of the second container 32 in which a workpiece has been accommodated, the test device 5 (the three-dimensional measuring device 5a) can be also used to function as an imaging unit for acquiring the post-conveyance image data so that the post-conveyance image data is acquired from the test device.

[Invention Included in Embodiment]

The above-described embodiment mainly includes the configurations shown below.

A robot system according to one aspect of the present disclosure includes a robot including a hand portion which grips and takes out a workpiece from an accommodation unit in which a plurality of workpieces are accommodated, and transports the workpiece to a predetermined position; a robot control unit which controls conveyance operation of the robot of taking out the workpiece from the accommodation unit and transporting the workpiece to the predetermined position; and a conveyance condition setting unit which sets a conveyance condition regarding the conveyance operation and including, in the workpiece, at least a grip prohibited region that is prohibited from being gripped by the hand portion, in which the robot control unit controls the robot based on the conveyance condition set by the conveyance condition setting unit.

According to this robot system, the grip prohibited region which is prohibited from being gripped by the hand portion is set according to a workpiece. Specifically, at the time of workpiece conveyance operation by the hand portion, a portion other than the grip prohibited region will be gripped by the hand portion. Accordingly, by setting a portion of a workpiece which is easily deformed or damaged due to its shape to be a grip prohibited region in advance, damaging of quality of the workpiece can be suppressed at the conveyance of the workpiece.

In this robot system, the conveyance condition setting unit preferably sets the conveyance conditions including at least, in addition to the grip prohibited region, an entry prohibited region which is a space around the workpiece and in which the hand portion is prohibited from approaching the workpiece.

According to this robot system, at the time of taking out a workpiece by the hand portion, the hand portion is prohibited from entering an entry prohibited region of other workpiece around a target workpiece as a take-out target. In other words, take-out of a target workpiece by the hand portion will be conducted such that the hand portion will not enter an entry prohibited region of other workpiece. Accordingly, by setting a fixed region including a portion of a workpiece which is easily deformed or damaged due to its shape to be an entry prohibited region in advance, at the time of taking out a workpiece from the accommodation unit, damaging of quality of other workpiece around the target workpiece can be suppressed.

This robot system preferably further includes a storage unit which stores the conveyance condition of the workpiece, in which in a case where a conveyance condition related to a similar workpiece which is similar in a shape to a target workpiece whose conveyance condition is to be newly set is already stored in the storage unit, the conveyance condition setting unit sets a conveyance condition of the target workpiece based on the conveyance condition of the similar workpiece.

In this robot system, since a conveyance condition of a target workpiece is set using an existing conveyance condition of a similar workpiece, labor for programming a conveyance condition for each workpiece from the beginning is saved.

In the robot system according to one aspect of the present disclosure, the conveyance condition setting unit preferably sets the conveyance condition based on an image of the workpiece.

In this robot system, since the conveyance condition is set from image data of a workpiece, labor is saved for programming a conveyance condition while inputting data such as individual numerical values which specify a shape of a workpiece.

In this case, the robot system preferably further includes a first imaging unit capable of capturing an image of a workpiece in the accommodation unit before execution of the conveyance operation, or a workpiece taken out from the accommodation unit and being gripped by the hand portion, in which the conveyance condition setting unit sets the conveyance condition based on the image of the workpiece captured by the first imaging unit.

This robot system enables image data of a workpiece to be acquired in the system and a conveyance condition to be set using the image data. Therefore, a conveyance condition can be set without separately preparing image data of a workpiece.

Each of the above-described robot systems preferably further includes a second imaging unit capable of capturing an image of a workpiece at the predetermined position after execution of the conveyance operation; and a learning unit which acquires control information of the robot control unit when the conveyance operation is executed, and outer appearance quality information of the workpiece based on the image captured by the second imaging unit, and learns the conveyance condition based on these pieces of information, in which the conveyance condition setting unit initially sets the conveyance condition and modifies the conveyance condition based on a learning result of the learning unit.

In this robot system, a conveyance condition is initially set by the conveyance condition setting unit, and the conveyance condition is modified based on machine learning by the learning unit. Accordingly, it is possible to search, by machine learning, for a conveyance condition under which ideal workpiece conveyance operation can be executed without initially setting a conveyance condition under which ideal workpiece conveyance operation can be executed.

This robot system preferably further includes a third imaging unit capable of capturing an image of a workpiece in the accommodation unit after execution of the conveyance operation, in which the learning unit further acquires, in addition to the control information and quality information of the workpiece at the predetermined position, outer appearance quality information of the workpiece in the accommodation unit based on the image captured by the third imaging unit, and learns the conveyance condition based on these pieces of information.

In this robot system, quality information of a workpiece in the accommodation unit after take-out of a workpiece is considered in machine learning of a conveyance condition. In other words, the hand portion can take into account an influence exerted on a workpiece around a take-out target workpiece. Therefore, it becomes possible to search for a conveyance condition under which not only quality of a workpiece as a take-out target but also quality of other workpiece at the time of the take-out can be maintained.

In the above-described robot system, the conveyance condition preferably further includes at least one of a gripping force of a workpiece gripped by the hand portion, a transport speed of the workpiece, and a grip position of the workpiece gripped by the hand portion.

This robot system enables machine learning to search for a conveyance condition under which ideal workpiece conveyance operation can be executed, the ideal workpiece conveyance operation being operation by which at the time of take-out of a workpiece or during transport, the workpiece will not be dropped off while maintaining quality of the workpiece.

In this robot system, the conveyance condition preferably includes a transport speed of a workpiece and a grip position of the workpiece gripped by the hand portion, and the learning unit preferably learns the grip position at which a transport speed becomes higher as soon as possible in a region other than the grip prohibited region in the workpiece.

This robot system enables machine learning to search for a conveyance condition under which a workpiece can be transported at a high speed while maintaining quality of the workpiece.

The above-described robot system preferably further includes a second storage unit which, with the storage unit being defined as a first storage unit, stores past arrangement information of a workpiece in the accommodation unit and past quality information of a workpiece in the accommodation unit, in which the first imaging unit is capable of capturing an image of a workpiece in the accommodation unit before execution of the conveyance operation, the conveyance condition includes an approaching method of approaching the workpiece by the hand portion for taking out the workpiece from the accommodation unit, and the learning unit learns to adopt an approaching method different from that of the conveyance condition in a case where workpiece arrangement information acquired from data of the image captured by the first imaging unit is the past workpiece arrangement information and is similar to workpiece arrangement information recognized to have a conveyance operation failure based on quality information of a workpiece in the accommodation unit.

This robot system enables machine learning to search for a conveyance condition (approaching method) under which quality of a workpiece can be maintained to be higher, in particular, at the time of taking out a workpiece.

In the above-described robot system, the conveyance condition setting unit preferably acquires information related to a surface state of a workpiece and sets the prohibited region based on the information related to the surface state.

This robot system enables a more optimum conveyance condition to be searched for in consideration of a surface state of a workpiece such as surface treatment.

The above-described robot system preferably includes at least one imaging unit functioning also as a plurality of imaging units.

This robot system realizes a reasonable configuration in which a part of the plurality of imaging units is also used for imaging of a workpiece.

In this case, the one imaging unit is preferably provided in a movable portion of the robot.

This robot system enables excellent imaging, by a common imaging unit, of a workpiece in the accommodation unit before execution of the conveyance operation, a workpiece in the accommodation unit after execution of the conveyance operation, and a workpiece at a predetermined position after execution of the conveyance operation.

The invention claimed is:

1. A robot system comprising:
   a robot including a hand portion configured to grip and take out a workpiece from an accommodation unit in which a plurality of workpieces are accommodated, and transport the workpiece to a predetermined position;
   a robot controller configured to control a conveyance operation of the robot of taking out the workpiece from the accommodation unit and transporting the workpiece to the predetermined position;
   a processor configured to operate as a conveyance condition setting unit configured to set a conveyance condition regarding the conveyance operation and including, at least a grip prohibited region of the workpiece that is prohibited from being gripped by the hand portion, a grip position of the workpiece gripped by the hand portion and a transport speed of the workpiece; and
   at least one camera configured to capture a first image of the workpiece in the accommodation unit before execution of the conveyance operation and a second image of the workpiece at the predetermined position after execution of the conveyance operation,
   wherein the processor is configured to operate as a learning unit configured to acquire control information of the robot controller when the conveyance operation is executed, the first image and the second image captured by the at least one camera, and to learn the conveyance condition based on the control information, the first image, and the second image,
   the robot controller is configured to control the robot based on the conveyance condition set by the conveyance condition setting unit,
   the learning unit is configured to compare the first image and the second image with each other, to evaluate a change in outer appearance quality of the workpiece during the conveyance operation, and to learn a grip position in a region other than the grip prohibited region of the workpiece which allows for an increased transport speed as compared to other grip positions, based on a result of the evaluation, and
   the conveyance condition setting unit modifies the conveyance condition based on a learning result of the learning unit.

2. The robot system according to claim 1, further comprising:
   a first camera configured to capture a third image of an inside of the accommodation unit after execution of the conveyance operation,
   wherein the learning unit is configured to compare first image data of the first image and third image data of the third image with each other, to evaluate a state of at least one remaining workpiece in the accommodation unit after execution of the conveyance operation, and to learn the conveyance condition based on a result of the evaluation.

3. The robot system according to claim 2, comprising one camera configured to capture at least the first image, and one of the second image and the third image.

4. The robot system according to claim 3, wherein the one camera is provided in a movable portion of the robot.

5. The robot system according to claim 2, wherein the conveyance condition further includes a gripping force of the workpiece gripped by the hand portion.

6. The robot system according to claim 2, wherein:
   the processor is configured to operate as a first storage unit configured to store the conveyance condition of the workpiece,
   the processor is configured to operate as a second storage unit which is configured to store past arrangement information of a workpiece in the accommodation unit and past quality information of a workpiece in the accommodation unit,
   the conveyance condition includes an approaching method of approaching the workpiece by the hand portion for taking out the workpiece from the accommodation unit, and
   the learning unit is configured to learn to adopt an approaching method different from that of the conveyance condition in a case where workpiece arrangement information acquired from the first image is similar to the past workpiece arrangement information and is similar to workpiece arrangement information recognized to have a conveyance operation failure based on quality information of a workpiece in the accommodation unit.

7. The robot system according to claim 1, wherein the conveyance condition setting unit is configured to set the conveyance condition including at least, in addition to the grip prohibited region, an entry prohibited region which is a space around the workpiece and in which the hand portion is prohibited from approaching the workpiece.

8. The robot system according to claim 7, wherein:
   the processor is configured to operate as a storage unit configured to store the conveyance condition of the workpiece, and
   in a case where a conveyance condition related to a similar workpiece which is similar in a shape to a target workpiece whose conveyance condition is to be newly set is already stored in the storage unit, the conveyance condition setting unit sets a conveyance condition of the target workpiece based on the conveyance condition of the similar workpiece.

9. The robot system according to claim 7, wherein the conveyance condition setting unit is configured to set the conveyance condition based on the first image.

10. The robot system according to claim 7, wherein the conveyance condition setting unit is configured to acquire information related to a surface state of the workpiece and to set the grip prohibited region based on the information related to the surface state.

11. The robot system according to claim 1, wherein
    the processor is configured to operate as a storage unit configured to store the conveyance condition of the workpiece, and in a case where a conveyance condition related to a similar workpiece which is similar in a shape to a target workpiece whose conveyance condition is to be newly set is already stored in the storage unit, the conveyance condition setting unit sets a conveyance condition of the target workpiece based on the conveyance condition of the similar workpiece.

12. The robot system according to claim 1, wherein the conveyance condition setting unit is configured to set the conveyance condition based on first image data and third second image data of the workpiece.

13. The robot system according to claim 1,
wherein the conveyance condition setting unit is configured to set the conveyance condition based on the first image.

14. The robot system according to claim 1, wherein the conveyance condition further includes a gripping force of the workpiece gripped by the hand portion.

15. The robot system according to claim 1, wherein:
the processor is configured to operate as a first storage unit configured to store the conveyance condition of the workpiece, and
the processor is configured to operate as a second storage unit which is configured to store past arrangement information of a workpiece in the accommodation unit and past quality information of a workpiece in the accommodation unit,
the conveyance condition includes an approaching method of approaching the workpiece by the hand portion for taking out the workpiece from the accommodation unit, and
the learning unit is configured to learn to adopt an approaching method different from that of the conveyance condition in a case where workpiece arrangement information acquired from the first image is similar to the past workpiece arrangement information and is similar to workpiece arrangement information recognized to have a conveyance operation failure based on quality information of a workpiece in the accommodation unit.

16. The robot system according to claim 1, wherein the conveyance condition setting unit is configured to acquire information related to a surface state of the workpiece and to set the grip prohibited region based on the information related to the surface state.

17. The robot system according to claim 1, further comprising:
a first camera configured to capture the first image of the workpiece in the accommodation unit before execution of the conveyance operation and capture a third image of an inside of the accommodation unit after execution of the conveyance operation, wherein
the first camera is provided in a movable portion of the robot, and
the learning unit is configured to compare first image data of the first image and third image data of the third image with each other, to evaluate a state of at least one remaining workpiece in the accommodation unit after execution of the conveyance operation, and to learn the conveyance condition based on a result of the evaluation.

18. The robot system according to claim 17, further including a third camera configured to capture an image of the workpiece which is taken out from the accommodation unit and which is in a state of being gripped by the hand portion.

* * * * *